United States Patent [19]

Tanaka

[11] Patent Number: 4,998,246
[45] Date of Patent: Mar. 5, 1991

[54] METHOD FOR TRANSMISSION OF CYCLIC DATA

[75] Inventor: Yasuhiro Tanaka, Hyogo, Japan

[73] Assignee: Mitsubishi Denki Kabushiki Kaisha, Tokyo, Japan

[21] Appl. No.: 387,159

[22] Filed: Jul. 31, 1989

[30] Foreign Application Priority Data

Aug. 5, 1988 [JP] Japan .................................. 63-196754
Mar. 9, 1989 [JP] Japan .................................. 64-56708
Jun. 12, 1989 [JP] Japan .................................. 64-150872

[51] Int. Cl.$^5$ .............................................. H04J 3/16
[52] U.S. Cl. .................................. 370/85.5; 370/85.4; 370/85.15; 340/825.05
[58] Field of Search ................... 370/85.4, 85.5, 85.7, 370/85.8, 85.2, 85.6, 85.15; 340/825.5, 825.51, 825.05

[56] References Cited

U.S. PATENT DOCUMENTS

| 4,454,508 | 6/1984 | Grow ................................ 370/85.5 |
| 4,587,650 | 5/1986 | Bell .................................. 370/85.5 |
| 4,707,830 | 11/1987 | Ulug ................................ 370/85.4 |
| 4,799,052 | 1/1989 | Near et al. ...................... 340/825.5 |
| 4,813,039 | 3/1989 | Yoshihiro ...................... 370/85.5 |
| 4,858,232 | 8/1989 | Diaz et al. .................... 340/825.05 |

OTHER PUBLICATIONS

John F. McCool, Telecommunications, vol. 21, No. 5, May 1987, pp. 10–14.

Primary Examiner—Douglas W. Olms
Assistant Examiner—Alpus H. Hsu
Attorney, Agent, or Firm—Rothwell, Figg, Ernst & Kurz

[57] ABSTRACT

A method for the transmission of cyclic data among stations in a looped transmission path which performs operations to bring the data in a shared cyclic memory up to date in a distribution control transmission system wherein a synchronous cyclic data transmission and an asynchronous event transmission are both included. In one aspect, the shortest token rotation time is first counted where synchronous cyclic data only are transmitted, and the timing of data transfer to a transmission buffer memory is thereafter selected to be such shortest token rotation time after the capture of a token by a station. In the second aspect, a dummy frame which cannot be received by any one of the stations in the loop is transmitted and synchronous data frames which have been queued in the transmission buffer memory are brought up to data by data in the cyclic memory during the transmission of the dummy frame. The transfer of synchronous data to the buffer memory is thus performed during the shortest token rotation time or during the dummy frame transmission time.

5 Claims, 6 Drawing Sheets ns system wherein a synchronous transmission for a cyclic data and an asynchronous transmission for an event are both included.

2. Description of the Prior Art

FIG. 1 is a block diagram showing one embodiment of one of stations which constitute a control data way for realizing a protocol of FDDI (Fiber Distributed Data Interface) which has been introduced in, for example, the technical journal entitled "Telecommunication" Vol. 21, No. 5 (issued May 1987).

Referring to FIG. 1, designated at numeral 1 is a circuit, namely, a communication channel while numeral 2 indicates a circuit connection unit. Designated at numeral 3 is a media access unit connected to the circuit connection unit 2 and equipped with a token synchronous timer 3a and a token holding timer 3b.

Numeral 4 indicates a buffer memory which is operative to transmit data to the media access unit 3 and receive same therefrom. The buffer memory 4 is provided with a transmission buffer memory 4a and a receiving buffer memory 4b. Designated at numeral 5 is a DMA transfer controller for controlling access to the buffer memory 4. Numeral 6 indicates a cyclic memory for storing synchronous data which require a real-time processing (namely, the performance of calculations in real time). Designated at numeral 7 is an event transmission controller for controlling asynchronous data which do not require real-time processing.

Numeral 8 indicates an external controller for controlling the cyclic memory 6 and the event transmission controller 7. Incidentally, one of stations 9 is constructed of the circuit connection unit 2, the media access unit 3, the buffer memory 4, the DMA transfer controller 5, the cyclic memory 6 and the event transmission controller 7 as shown in FIG. 1.

FIG. 2(a) and (b) show an allocation of job data assigned to frames, in which FIG. 2(a) is a diagram showing the allocation of a token frame 10. In the token frame 10, there are provided a start delimiter 10-SD, a frame control address 10-FC, a destination address 10-DA, a transmission source address 10-SA, a frame check sequence 10-FCS and an end delimiter 10-ED.

In addition, FIG. 2(b) is a diagram showing the allocation of a data frame 11. In the data frame 11, there are provided a start delimiter 11-SD, a frame control address 11-FC, a destination address 11-DA, a transmission source address 11-SA, an information area 11-INFO, a frame check sequence 11-FCS, an end delimiter 11-ED and a frame status 11-FS.

FIG. 3 is an overall schematic view of a control data way which has been constructed by using the above-described stations. In the drawing, a plurality of stations 9a, 9b and 9c are connected to a looped transmission path 12. As also shown in FIG. 1, each of the stations 9a, 9b and 9c is provided with the media access unit 3, the cyclic memory 6 and the event transmission controller 7. External controllers 8a, 8b and 8c are connected to their corresponding stations 9a, 9b and 9c.

Next, the operation of the above exemplary frames will be described. When one of the stations 9 connected to the looped transmission path 12 acquires an access to the token frame 10 of the allocation shown in FIG. 2(a), the station takes priority of the transmission loop, namely, becomes ready to transmit information of the data frame 11 of the allocation illustrated in FIG. 2(b). At this time, values obtained by the token rotation timer 3a are duplicated to the token holding timer 3b and the token rotation timer 3a is established (namely, reset) to a predetermined value, whereby the counting of time is resumed. Here, the token rotation timer 3a has already started counting the time from the time of capture of the preceding token. This has been done by subtracting from a preset value the count of time from the capture of the preceding token to the capture of the present token, in other words, by performing a downcount. It is therefore possible to determine a data transmission enable time for asynchronous data by the values of the token rotation timer 3a at the time of the capture of the token. Values thus obtained are set in the token holding timer 3b. Incidentally, a preset value to be set in the token rotation timer is a token rotation target time (TRTT) which corresponds to a target value of a token rotation time.

At this time, transmission cyclic data from one of the stations 9 are queued in the transmission buffer memory 4a and are ready for sending as synchronous data. The transmission cyclic data are however transmitted to the others of the stations 9 when said priority for the transmission is taken.

As the timing at which the transmission cyclic data are transferred from the cyclic memory 6 to the transmission buffer memory 4a, the time of token capture, token issue or the like is used by way of example because it is uncertain how soon the next token will be inputted.

When the transmission of the synchronous data is terminated completely, the transmission of the asynchronous data stored in the transmission buffer memory 4a is performed until the token holding timer 3b is rendered expired. Here, the term expired means that the token holding timer 3b has counted downwards and indicates "0".

The token holding timer 3b stops counting the time during the transmission of the synchronous data and performs counting the time during the transmission of the asynchronous data frame. When the token rotation timer 3a has already been rendered to an expired state upon the token frame capture, the transmission of the asynchronous data is not performed.

According to this method, the time required to transmit the synchronous data and asynchronous data, namely, the token rotation time will not be in excess of a value obtained by resetting the token rotation timer 3a, namely, twice the token rotation target time.

Incidentally, this transmission method can always maintain the same quantity of synchronizing data in each station providing that the quantity of synchronizing data transmitted by the acquisition of a token, in other words, the quantity of transmission data of the station in the cyclic memory 6 itself is set so as to become equal each time. Further, the token circulating time will not be in excess of the token circulating target time which is preset in the token circulation timer 3a. A certain constant response is assured to occur to each of cyclic data, so that some improvements have been brought about.

The renewal of cyclic data has conventionally been performed by the above-described method. However, as the timing at which the cyclic data are transferred from the cyclic memory 6 to the transmission buffer memory 4a, the time of token capture or the time of token issue has been employed. Such a method has therefore been accompanied by the problem that it is necessary to take time of twice (or one time) the token rotation target time at the maximum for causing the cyclic data to be transmitted to a looped transmission path after the cyclic data has been transferred from the cyclic memory to the transmission buffer memory, so that a response relative to the cyclic data is reduced.

SUMMARY OF THE INVENTION

The present invention has been accomplished in an attempt to solve the above-described problem. It is an object of this invention to provide a method for the transmission of cyclic data, which is capable of reducing time required to transmit the data to a looped transmission path after the cyclic data is transferred from a cyclic memory to a transmission buffer memory upon the renewal of data in the cyclic memory.

It is another object of this invention to provide a method for the transmission of cyclic data, which is superior in response ability to the conventional transmission method and capable of being fabricated in apparatus form at low prices.

In one aspect of this invention, there is thus provided a method for the transmission of cyclic data with a view toward achieving the above-described object, which provides that synchronous data are only transmitted upon a first token rotation after the initialization of a looped transmission system by way of example, a token rotation time from the first token capture to a second token capture is counted until the shortest token rotation time is hence obtained from the transmission of the synchronous data only. The transfer of transmission data to the transmission buffer memory from the cyclic memory is thereafter performed upon an elapsed time of the shortest token-capture time after the capture of the preceding token.

In the second aspect of this invention, there is also provided a method for the transmission of cyclic data with a view toward achieving the above-described object, which provides that a dummy frame, which cannot be received by any one of stations, is transmitted to a looped transmission path upon the capture of a token, and synchronous data frames which have been queued in the transmission buffer memory are brought up to date with updating of data in the cyclic memory during the transmission of the dummy frame.

According to the method for the transmission of the cyclic data in the above-described first aspect, the shortest token rotation time needed to transmit the synchronous data alone is measured in advance. The shortest token rotation time is preset upon the capture of a token by a station so as to start counting the time and hence to provide a transfer timing relative to the transmission buffer memory at the expired condition. Accordingly, it is possible to renew transmission data in the transmission buffer memory at the latest time before the capture of the next token.

According to the method for the transmission of the cyclic data in the above-described second aspect, the transmission of the dummy frame to the looped transmission path is started upon capture of the token and the synchronous data frames which have been queued in the transmission buffer memory are brought up to date with updating of the data in the cyclic memory. As a consequence, the updated cyclic data can be transmitted subsequent to the completion of transmission of the dummy frame.

The above and other objects, novel features and advantages of the present invention will become more apparent from the following detailed description and the appended claims, taken in conjunction with the accompanying drawings. Needless to say, the drawings are used for description purposes only. No limitation is therefore imposed on the scope of the present invention.

DETAILED DESCRIPTION OF THE PREFERRED EMBODIMENTS

Figure 1:
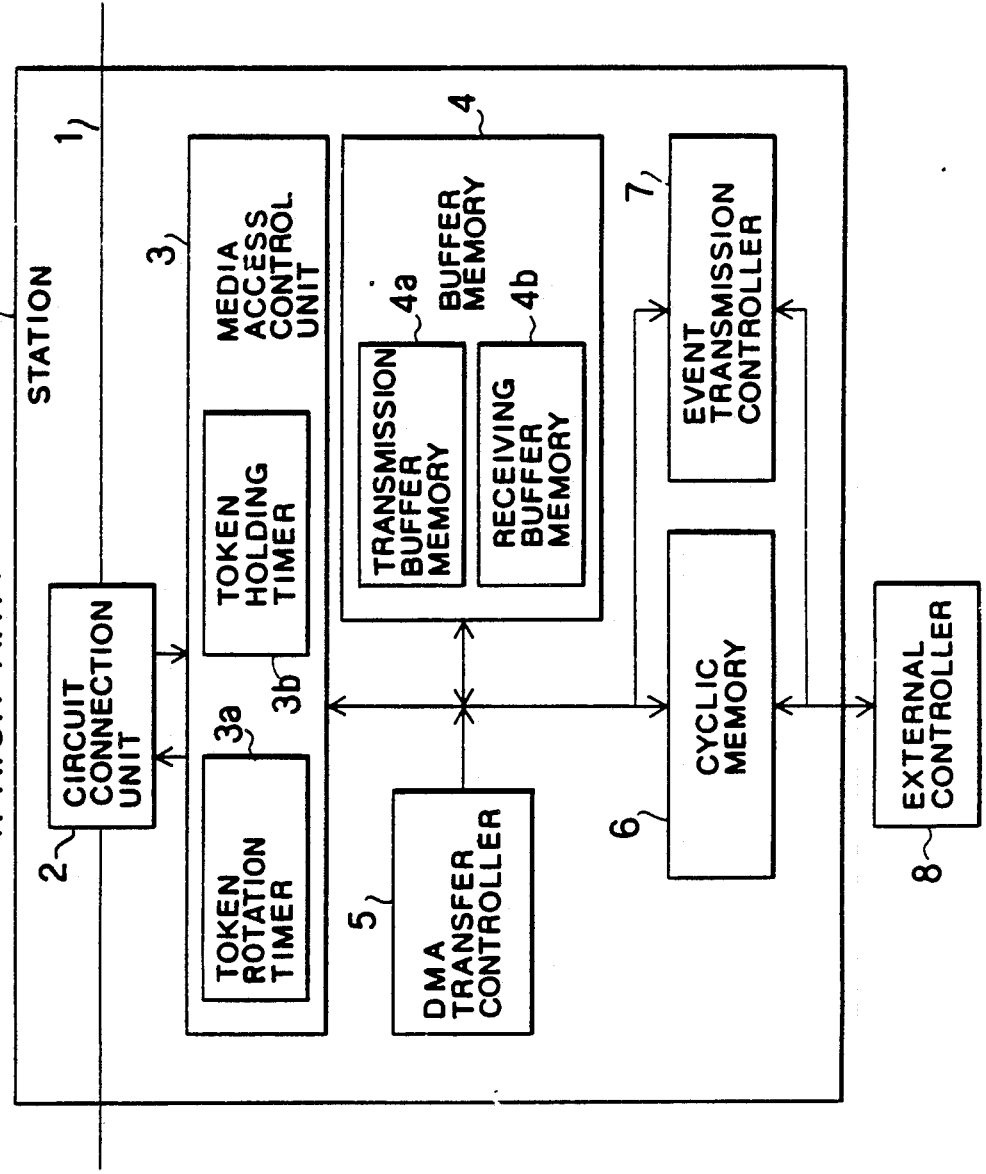
FIG. 1 is a block diagram showing one of stations which constitute a conventional control data way.

Preferred embodiments of this invention will hereinafter be described in detail with reference to the accompanying drawings. Incidentally, the same elements of structure as those in the above-described conventional example are hereinafter identified by like reference numerals and the description of common elements will therefore be omitted herein.

Figure 4:
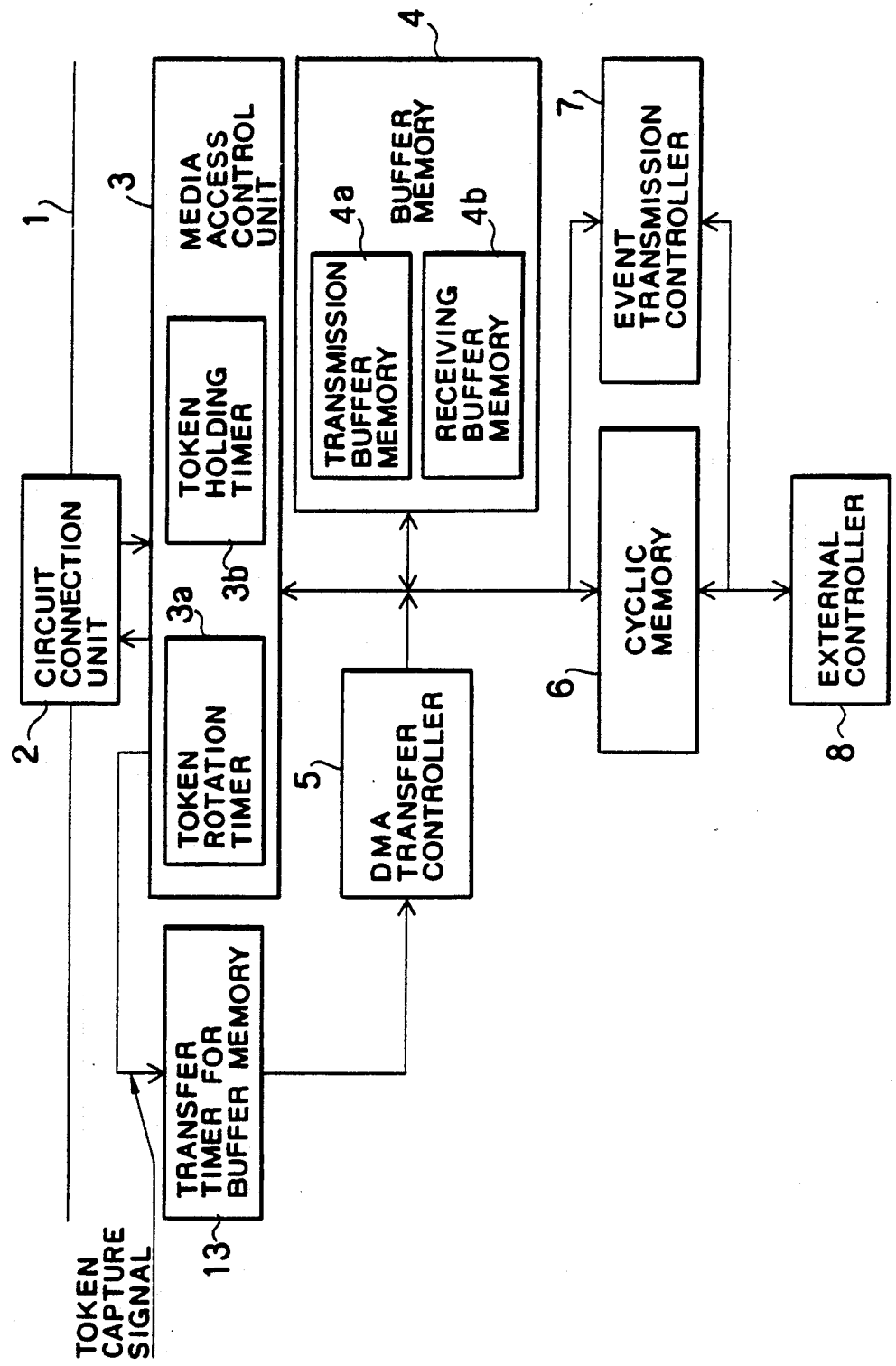
FIG. 4 is a block diagram illustrating the construction of a station for a control data way according to a first embodiment of this invention.

FIG. 4 is a block diagram showing the construction of the station according to the first embodiment. A principal feature of this embodiment resides in that a transfer timer 13 for a buffer memory, which serves to receive a token capture signal from a media access control unit 3 for supplying output data to a DMA transfer controller 5, is provided in the station.

Figure 2A:
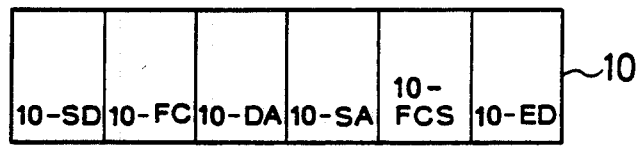
FIGS. 2(a) and 2(b) show allocations of job data assigned to frames.
Figure 2B:
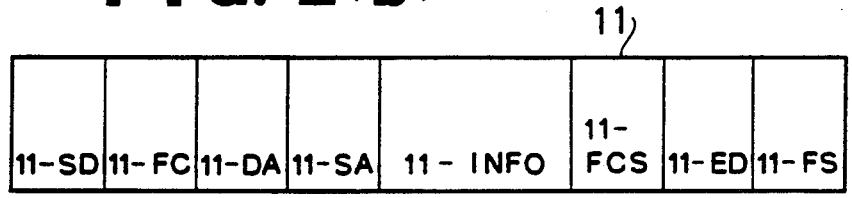
Figure 3:
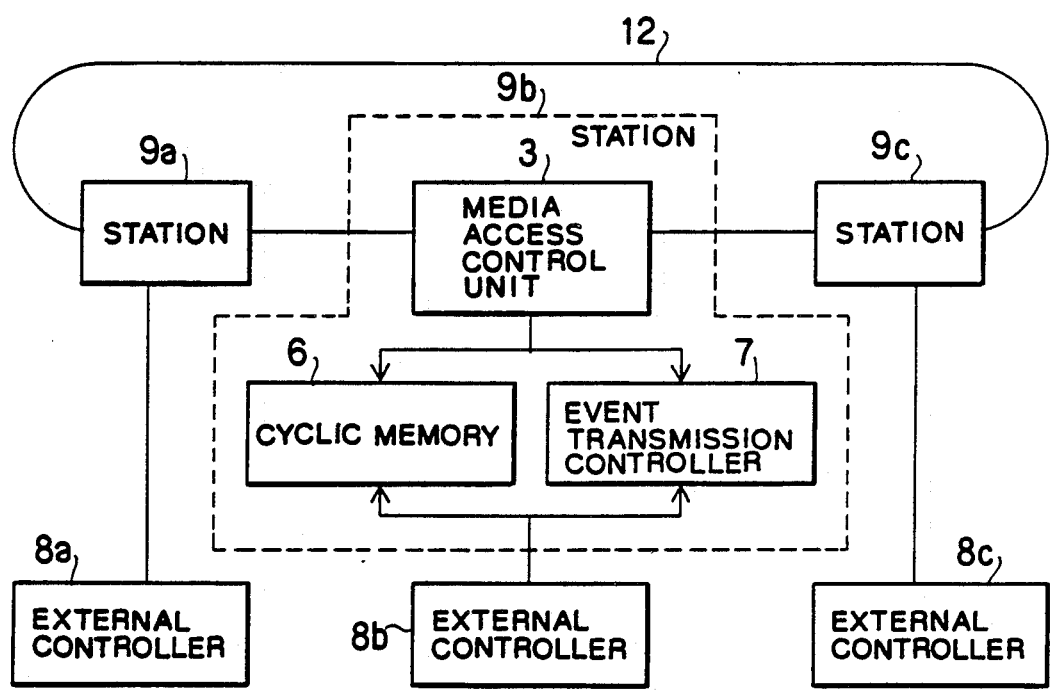
FIG. 3 is an overall schematic view of a control data way.

In addition, a token frame 10 and a data frame 11 is constructed in the same manner as in the conventional example shown in FIGS. 2(a) and 2(b) aforementioned. Operational processings of a token circulating timer 3a and a token holding timer 3b are also the same as in the prior art.

In the present embodiment, when the token frame 10 is acquired, each of stations becomes ready to transmit information of the data frame 11. At this time, values of the token rotation timer 3a are duplicated into the token holding timer 3b and the token rotation timer 3a is reset to start counting the time again.

When a station 9 becomes ready to transmit data, the station 9 transmits transmission cyclic data of the station itself whose data are queued in a transmission buffer memory 4a and ready for sending as synchronous data.

During the transmission of the synchronous data, the token holding timer 3b does not perform counting the time. It is possible to transmit asynchronous data until attainment of the expired status of the token holding timer 3b, provided that the token holding timer 3b has already started counting the time after completion of the transmission of synchronous data and the asynchronous data have been queued for their transmission.

Cyclic transmission data for each station, which are transmitted at the time of one token capture, are fixed as synchronous data. The sum of the synchronous data to be transmitted over the loop entirety is established to be constant for each token.

In doing so, a preset value for the token rotation timer 3a to be reset upon the capture of a token, namely, a token rotation target time (which will hereinafter be called "TRTT") will not be in excess of the time of from the token capture to the next token capture.

In addition, the token rotation target time TRTT is not shorter than the sum of time required to transmit the synchronous data over the loop (the summed time will hereinafter be called "the shortest token rotation time $T_S$").

It is therefore, impossible to develop the next token during the period of from the token capture to the shortest token rotation time $T_S$ required to transmit the synchronous data over the loop.

The shortest token synchronous time $T_S$ is therefore measured and the transfer of data to the transmission buffer memory 4 from the cyclic memory 6 is executed at an elapsed time of $T_S$ after the capture of a token. As a result, an interval, namely, a gap of time from the time of queuing for the transmission to the time of token capture is reduced.

The counting of $T_S$ is performed at the time of the initialization of the looped transmission system. In other words, after the initialization of the looped transmission system, each of the stations performs the transmission of the synchronous data alone upon the capture of a first token and counts the time up to capture of the next token. As a consequence, the resultant time is used as $T_S$.

In the conventional method, a time gap from the transfer of the synchronous data to the transmission buffer memory 4a to the capture of a token has been indicated as TRTT at the maximum even if the quantity of the synchronous data is always rendered equal each time. The present embodiment can however bring about the gap $TRTT-T_S$. As a result, an improvement in the time corresponding to $T_S$ has been brought about.

Here, the counting of the above $T_S$ and the timing at which data are transferred to the transmission buffer memory 4a from the time of capture of a token are controlled by counting the time using a transfer timer 13 for a buffer memory. In other words, the transfer timer 13 is operated such that the above $T_S$ is preset, and starts counting the time from the time of capture of the token by performing a downcount. In addition, when the transfer timer 13 is rendered a countup status, signals are supplied to the DMA transfer controller 5 and synchronous data held in an area within the cyclic memory 6 itself are transferred to the transmission buffer memory 4a.

Accordingly, the synchronous data which have been queued in the transmission buffer memory 4a can be transmitted when the next token is captured.

Figure 5:
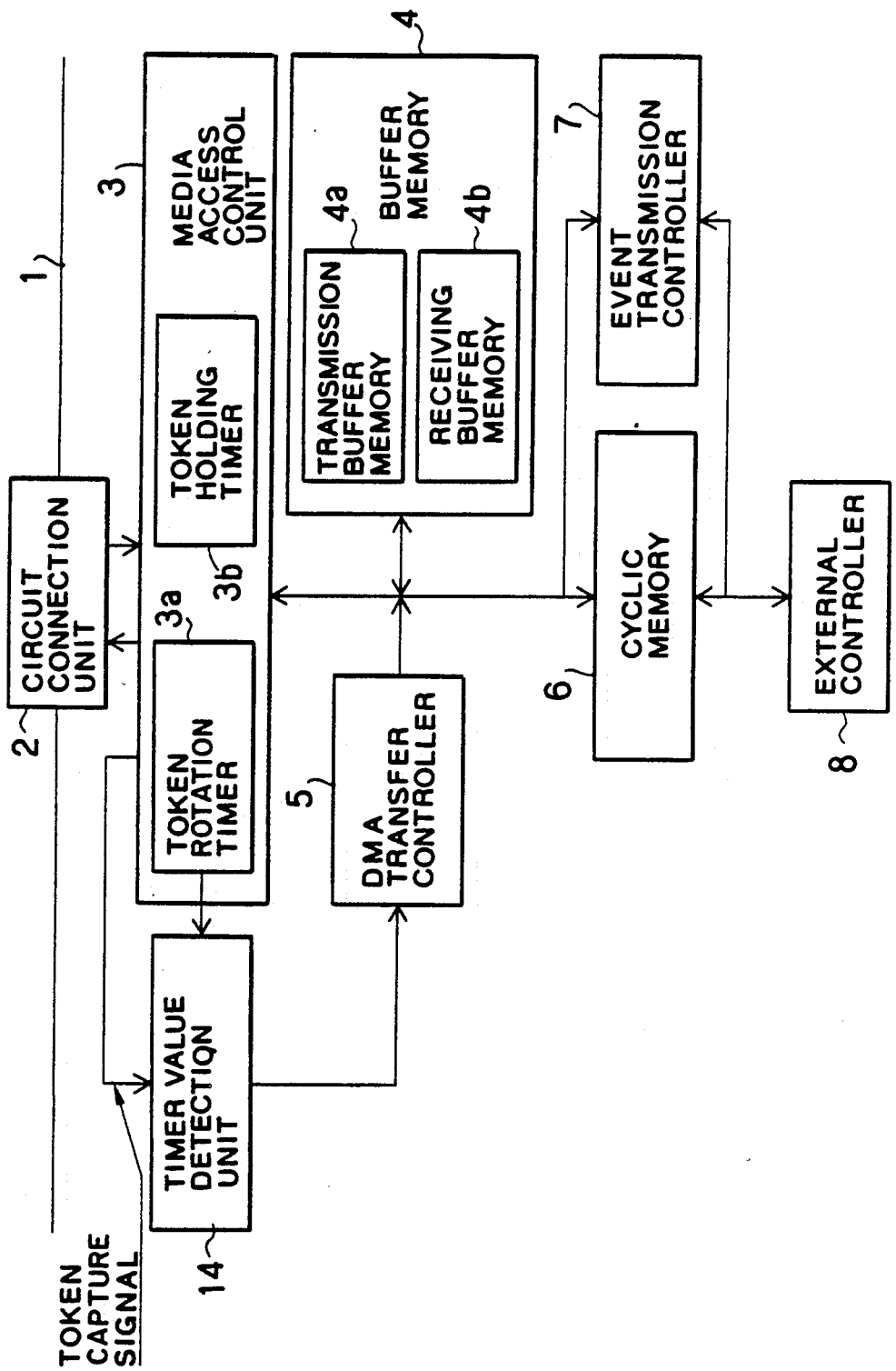
FIG. 5 is a block diagram showing the construction of a station for a control data way according to a modification of the first embodiment.

Incidentally, the transfer timer 13 for the buffer memory has been employed in the above-described embodiment shown in FIG. 4 in order to count the above $T_S$ and to adjust the timing at which the data are transferred to the transmission buffer memory 4a from the time of the capture of the token. However, if counts are obtained from the token rotation timer 3a, a timer value detection unit 14 may be used as an alternative to the transfer timer 13 as shown in FIG. 5. In other words, since the value TRTT preset in the token rotation timer 3a and the shortest token rotation time $T_S$ has been determined in advance, the time interval $T_S$ elapsed after capture of the token can be sensed by values from the token rotation timer 3a. Accordingly, the value of $TRTT-T_S$ is held in the timer value detection unit 14. It is only necessary to perform the transfer only when this value is reached.

The second embodiment will next be described with reference to FIGS. 6 and 7.

Figure 6:
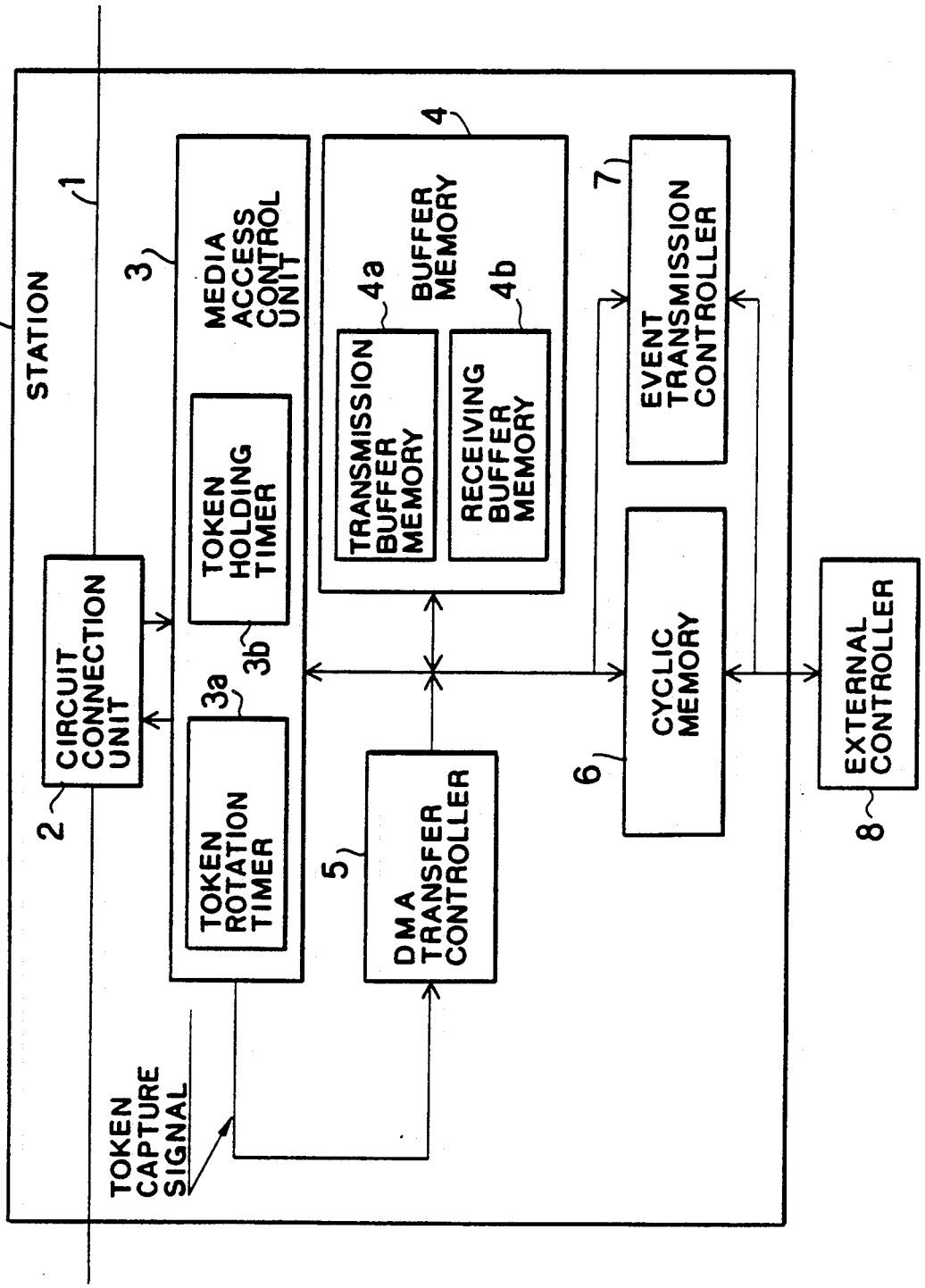
FIG. 6 is a block diagram showing the construction of a station for a control data way according to a second embodiment of this invention.
Figure 7:
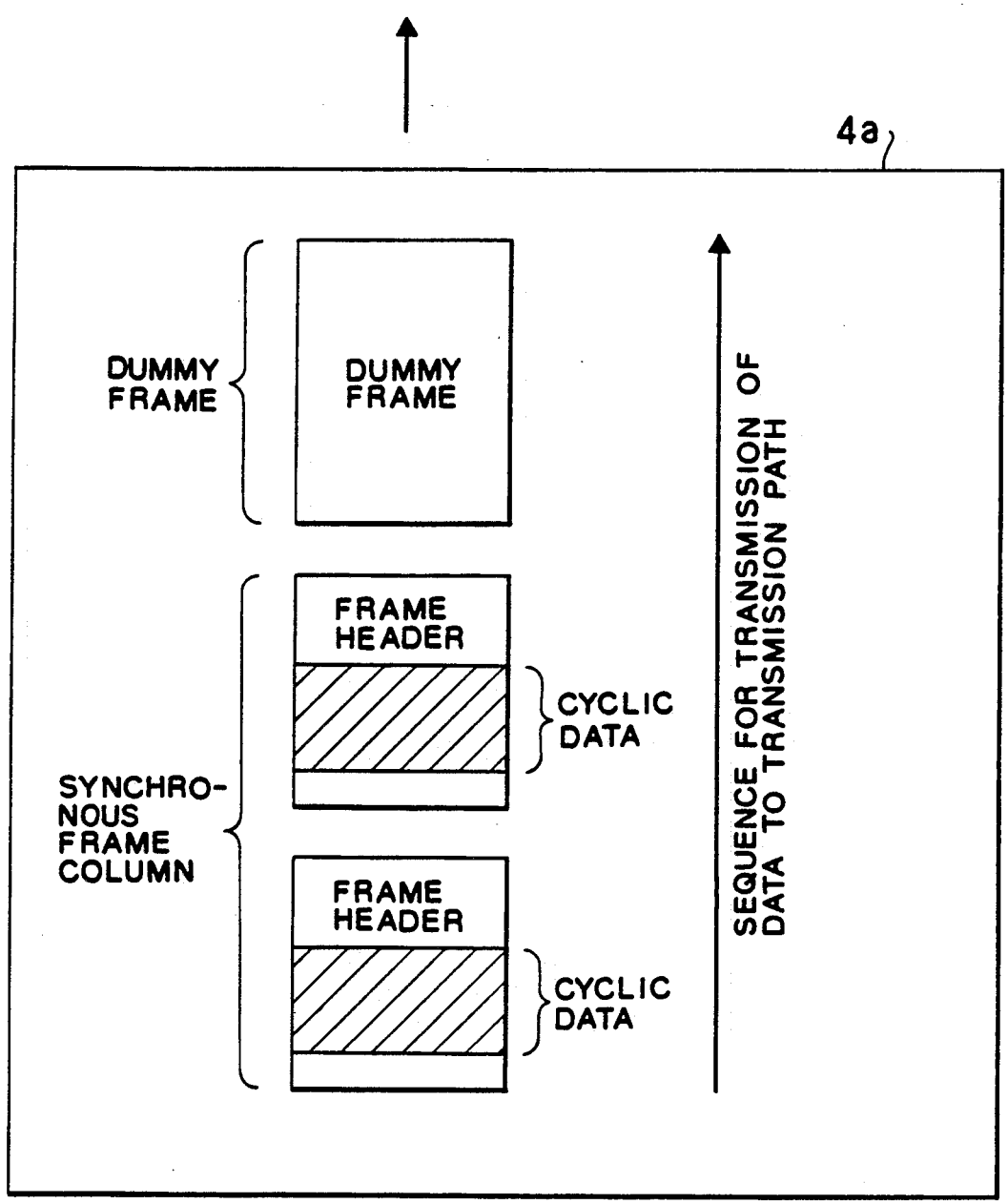
FIG. 7 is a chart for describing data which have been queued in a transmission buffer memory according to the above-described second embodiment.

This embodiment features that a dummy frame is added to the beginning of the synchronous frame which is queued in the transmission buffer memory 4a of FIG. 6. In other words, as illustrated in FIG. 7, the dummy frame is added to the beginning of the synchronous frame which has been queued in the transmission buffer memory 4a.

Accordingly, when a token is captured by a station 9, a synchronous frame column which has been queued in the transmission buffer memory 4a and ready for sending as the synchronous frames in the same manner as in the prior art is transmitted to the circuit 1. Added to the beginning of the synchronous frame column is however the dummy frame. Here, the dummy data frame and synchronous data frames are made discrete under a FC frame control. The dummy frame has been instructed in such a way that any of the stations performs a relay operation only without carrying out a receiving processing.

During the transmission of the dummy frame, the DMA transfer controller 5, which has received token capturer signals, is so operated that information on cyclic data contained in the synchronous data frames is brought up to date by the data of the transmission area of the self-station in the cyclic memory 6 of the station itself.

Assuming that the length of the dummy frame is set to a value larger than time required for the above-described updating, the timing of transmission of the synchronous data frames to the looped transmission path is not advanced to the renewal by the data of the transmission area of the self-station in the cyclic memory 6.

The frame column for the synchronous data, which has been renewed by the cyclic data of the transmission area of the station itself, is transmitted to the circuit 1 subsequent to the transmission of the dummy frame. In other words, the actual time required to transmit the cyclic data of the transmission area of the station itself was conventionally equivalent to the token rotation time at the maximum. The actual time however corresponds to the time required to transmit the dummy frame in the present embodiment. Accordingly, the transmission time referred to above is shortened by a difference between the token rotation time and the dummy frame transmission time.

Incidentally, the separation of the dummy frame from others by the FC frame control has been exemplified in the above-described embodiment. However, the same operation as in the above can also be achieved by specifying a destination address as an address which is actually absent so as to cause same to be transmitted.

Incidentally, another embodiment of transmission method can always maintain the same quantity of synchronous data in each station providing that the quantity of synchronous data transmitted by the capture of a token, in other words, the quantity of transmission data of the station in the cyclic memory 6 itself is set so as to become equal each time. Further, the token rotation time will not be in excess of the token rotation target time which is preset in the token rotation timer 3a. A certain constant response is assured to occur to each of cyclic data, so that some improvements have been brought about.

According to the present embodiment in the above-described manner, at the time of the capture of a token, the synchronous data frames are brought up to date with updating of data in the cyclic memory during the transmission of the dummy frame, so that the real-time processing of the synchronous data can significantly be improved.

According to the present invention as has been described above, the transfer of the synchronous data to the transmission buffer memory is performed during the shortest token rotation time. The present invention can therefore bring about advantages that an apparatus can be manufactured at low prices and a method for the transmission of cyclic data whose method has a good response can be achieved.

What is claimed is:

1. A method for transmission of cyclic synchronous data and asynchronous event data among a plurality of stations each of which is connected to a corresponding looped transmission path that provides a communication network, in which synchronous data of self-station in a cyclic memory which is common to all the stations in said network, are temporarily stored in a transmission buffer memory and are thereafter transmitted to all the stations upon capture of a token, comprising the steps of:

counting a time from the time of capture of a first token to the time of capture of a second token for each of said plurality of stations during which only synchronous data are transmitted to obtain a shortest token rotation time $T_S$;

thereafter updating the transmission buffer memory of a station by transferring data thereto from said cyclic memory at a time equal to $T_S$ after the capture of a token;

counting a time between successive captures of a token during which time both synchronous and asynchronous data are transmitted to obtain a counted token rotation time;

setting a token holding enable time with the difference between a predetermined token rotation target time and the counted token rotation time; and counting said token holding enable time to allow transmission of asynchronous data by the station holding said token after the completion of transmission buffer memory data transmission for a time period equal to said difference.

2. The method as claimed in claim 1, further comprising the step of presetting said shortest token rotation time in a transfer timer, said transfer timer enabling the updating of data in said transmission buffer memory when said shortest token rotation time has been counted out after the capture of a token.

3. The method as claimed in claim 1, which further comprises the step of detecting an elapsed interval of the shortest token rotation time by a timer value detection unit.

4. The method as claimed in claim 1, further comprising the step of setting the quantity of synchronous data in the cyclic memory of each station to be an equal amount for each transmission cycle.

5. A method for transmission of cyclic synchronous data and asynchronous event data among a plurality of stations each of which is connected to a corresponding looped transmission path that provides a communication network, in which synchronous data of a self-station in a cyclic memory which is common to all the stations in said network, are temporarily stored in a transmission buffer memory and are thereafter transmitted to all the stations upon capture of a token, and asynchronous data are transmitted after the completion of synchronous data transmission, comprising the steps of:

transmitting a dummy frame containing no information upon capture of a token; and updating data in said transmission buffer memory by transfer of data from said cyclic memory during the period of dummy frame transmission.

* * * * *

UNITED STATES PATENT AND TRADEMARK OFFICE
CERTIFICATE OF CORRECTION

PATENT NO. : 4,998,246

DATED : March 5, 1991

INVENTOR(S) : Yasuhiro Tanaka

It is certified that error appears in the above-identified patent and that said Letters Patent is hereby corrected as shown below:

Title page:
In the Abstract, fifth line from bottom, "data" (first occurrence) should be --date--.

Column 1, line 26, "synchronous" should be --rotation--.

Signed and Sealed this

Third Day of November, 1992

Attest:

DOUGLAS B. COMER

Attesting Officer

Acting Commissioner of Patents and Trademarks